3,100,222
ALKOXYALKYL 3,4-DICHLOROCARBANILATES
David J. Beaver, Richmond Heights, and Paul J. Stoffel, St. Louis, Mo., assignors to Monsanto Chemical Company, St. Louis, Mo., a corporation of Delaware
No Drawing. Filed Dec. 19, 1958, Ser. No. 781,446
4 Claims. (Cl. 260—471)

The present invention relates to new and useful compounds having the following structure

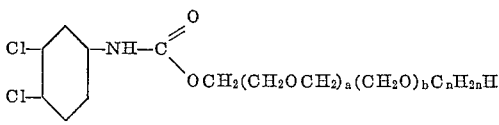

where $a$ is an integer from 1 to 8; $b$ has a value from 0 to 1, and $n$ has a value from 0 to 4 and to the process of making the same.

The invention also relates to certain compositions comprising (1) a cleansing compound such as soap or other organic cleansing detergent including either anionic or non-ionic surface active detergents and mixtures thereof; and (2) an alkoxyalkyl 3,4-dichlorocarbanilate.

Accordingly it is an object of this invention to provide new alkoxyalkyl and hydroxy-substituted alkoxy alkyl 3,4-dichlorocarbanilates which possess bacteriostatic properties.

Another object is to provide a process for the preparation of these compounds.

A still further object is to provide new compositions of matter comprising an organic cleansing detergent such as soap and a member of this new class of chemical compounds of alkoxyalkyl 3,4-dichlorocarbanilates which in combination constitute a valuable bacteriostatic cleansing composition.

These and other objects will be apparent to those skilled in the art from the description that follows.

The process employed in preparing the new alkoxyalkyl 3,4-dichlorocarbanilates of this invention generally involves the reaction of an alkoxy polyethylene glycol with 3,4-dichlorophenyl-isocyanate, usually at room temperature. The above reaction may take place in a solvent medium such as benzene, heptane, ether, chloroform or similar non-reactive organic solvents. The reaction mixture is usually stirred throughout the reaction which is exothermic in nature. The desired product may be obtained as an oil or as a solid which may be further purified by crystallization from an appropriate solvent.

As illustrative of the new compounds and the manner in which they are prepared are the following:

EXAMPLE I

*11-Hydroxy-3,6,9-Trioxaundecyl 3,4-Dichlorocarbanilate*

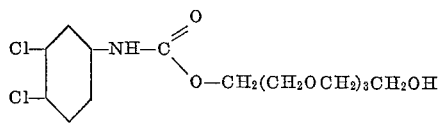

A solution consisting of 19.4 g. (0.1 mole) of polyethylene glycol having an approximate molecular weight of 200 and 100 ml. benzene were mixed at room temperature with a solution consisting of 18.8 g. (0.1 mole) 3,4-dichlorophenylisocyanate. The mixture was allowed to stand for 18 hours during which time there was a slight evolution of heat. The solvent was then evaporated on a steam bath and there was recovered 29.0 g. of 11-hydroxy-3,6,9-trioxaundecyl 3,4-dichlorocarbanilate as a light brown viscous liquid. Percent chlorine, theory, 18.6%; found 18.75%.

EXAMPLE II

*3,6,9,12,15,18,21-Heptoxadocosyl 3,4-Dichlorocarbanilate*

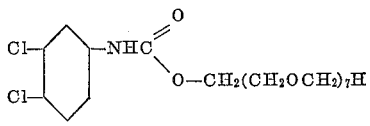

A charge of 34.0 g. (0.1 mole) Carbowax, a methoxypolyethylene glycol, and 18.8 g. (0.1 mole) 3,4-dichlorophenylisocyanate was mixed at room temperature and allowed to stand until a clear solution formed. The solution was heated on a steam bath for 3 hours. There was recovered 51.2 g. 3,6,9,12,15,18,21-heptoxadoscosyl 3,4-dichlorocarbanilate as a reddish brown viscous liquid.

EXAMPLE III

*2-(2-Methoxyethoxy)Ethyl 3,4-Dichlorocarbanilate*

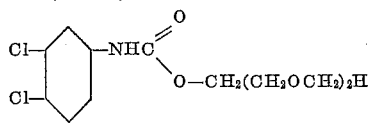

A charge of 9.4 g. (0.05 mole) of 3,4-dichlorophenylisocyanate and 6.0 g. (0.05 mole) of methyl Carbitol, which is a methoxy polyethylene glycol, were mixed with stirring; a vigorous reaction took place forming a viscous syrup. After 10 minutes, while still hot, the mix was poured into 400 ml. of cold heptane from which 2-(2-methoxyethoxy) ethyl 3,4-dichlorocarbanilate crystallized as fine colorless needles. M.P. 63.5–64.2°. Yield: 92.3%.

EXAMPLE IV

*2-Methoxyethyl 3,4-Dichlorocarbanilate*

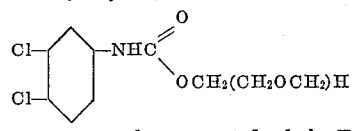

Using the same procedure as set forth in Example III but reacting 9.4 g. (0.05 mole) 3,4-dichlorophenylisocyanate with 3.8 g. (0.05 mole) methyl Cellosolve, a methoxy polyethylene glycol, there were obtained small white granules of 2-methoxyethyl 3,4-dichlorocarbanilate (M.P. 56.0–57.0° C.). Yield: 86.4 percent. Analysis: Percent chlorine calculated 26.84; found 27.0.

EXAMPLE V

*2-Butoxyethyl 3,4-Dichlorocarbanilate*

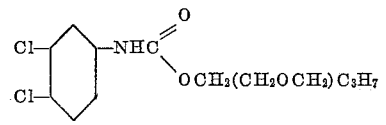

Using the same procedure as set forth in Example III but reacting 18.8 g. (0.1 mole) 3,4-dichlorophenylisocyanate with 11.8 g. (0.1 mole) 2-butoxyethanol, there was obtained 2-butoxyethyl 3,4-dichlorocarbanilate as a pale yellow oil. Analysis: Percent chlorine calculated, 23.18; found 22.95.

Compounds contemplated by this invention, in addition to those set forth in the examples above, include:

3,6,9-trioxadecyl 3,4-dichlorocarbanilate,
26-hydroxy-3,6,9,12,15,18,21,24-octoxahexacosyl 3,4-dichlorocarbanilate,
3,6,9-trioxadodecyl 3,4-dichlorocarbanilate,
3,6,9,12-tetraoxatridecyl 3,4-dichlorocarbanilate,
3,6,9,12-tetraoxatetradecyl 3,4-dichlorocarbanilate,
14-hydroxy-3,6,9,12-tetraoxatetradecyl 3,4-dichlorocarbanilate,
3,6,9,12,15-pentaoxahexadecyl 3,4-dichlorocarbanilate,
3,6,9,12,15-pentaoxaheptadecyl 3,4-dichlorocarbanilate,
2[2-(2-hydroxyethoxy) ethoxy] ethyl 3,4-dichlorocarbanilate,
2-propoxyethyl 3,4-dichlorocarbanilate,
2-(2-propoxyethoxy) ethyl 3,4-dichlorocarbanilate,
2-(2-butoxyethoxy) ethyl 3,4-dichlorocarbanilate, and the like.

The compounds of this invention having the general formula given above have been found to have excellent bacteriostatic or antiseptic properties in cleansing compositions. By cleansing compounds are meant soaps or other detergents and mixtures thereof. The term soap is employed in its popular meaning and refers to cleansing agents usually made by the action of an alkali on fat or fatty acids, e.g., the sodium or potassium salts of either saturated or unsaturated fatty acids. By way of example each of the compounds described in Examples I through IV above were separately incorporated in a neutral high grade white soap (a mixture of 80 percent sodium soap and 20 percent potassium soap produced from a 70 percent tallow and 30 percent oil glyceride blend in accordance with U.S. Patent 2,295,594), in a weight ratio of two parts to 100 parts by weight soap. Aliquots of each were added to a Sabouraud's dextrose agar medium so as to give concentrations of the compounds in the agar as set forth in Table I below. The agar in each case was then poured into a petri dish, allowed to harden, and then inoculated with a standard culture of the bacterium *Micrococcus pyogenes* var. *aureus* of standard resistance. The incubation in each instance was made simultaneously at 37° C. for 48 hours. The extent of growth is noted below:

TABLE I

| Compound | Concentration (part per) | | | | | | |
|---|---|---|---|---|---|---|---|
| | 1T[1] | 10T | 100T | 1M[2] | 5M | 10M | 50M |
| A | − | − | − | − | − | − | − |
| B | − | − | − | − | * | − | * |
| C | − | − | − | − | | | |
| D | − | − | − | + | | | |
| E | − | − | − | + | | | |

Legend: + growth; − no growth; * not tested; T thousand; M million
NOTE.—A=11-hydroxy-3,6,9-trioxaundecyl 3,4-dichlorocarbanilate. B=3,6,9,12,15,18,21-heptoxadocosyl 3,4-dichlorocarbanilate. C=2-(2-methoxyethoxy)ethyl 3,4-dichlorocarbanilate. D=2-methoxyethyl 3,4-dichlorocarbanilate. E=2-butoxyethyl 3,4-dichlorocarbanilate.

It is to be understood that the use of the alkoxyalkyl dichlorocarbanilates as set forth in the above example with soap is merely illustrative and that these compounds may also be used with other detergents including the so-called anionic and non-ionic detergents and have proven equally effective therein. Other alkali metal soaps of higher fatty acids of animal or vegetable origin may be used such as stearic, lauric, palmitic, oleic, linoleic, ricinoleic, and the like, including mixtures thereof obtained from tallow, lard, coconut oil, palm oil, castor oil, olive oil, hydrogenated fish and cottonseed oils and the like.

The detergents of this invention include the organic anionic type such as the well known surface active alkali metal sulfonates and sulfates. Representative of these are the long chain alkyl aryl sulfonates, i.e. those wherein the alkali radical is straight or branched in structure and contains from 8 to 22 carbon atoms, but preferably 10 to 16 carbon atoms, examples of which being octyl, decyl, dodecyl, keryl, pentadecyl, hexadecyl, octadecyl, mixed long chain alkyls derived from long chain fatty materials such as the lauryl radical, cracked paraffin wax olefins, polymers of lower mono-olefins such as propylene tetramer and the like, and wherein the aryl radical is derived from benzene, toluene, xylene, phenol, the cresols, naphthalene, and the like. Specific examples of such comprise sodium decyl benzene sulfonate, sodium dodecyl benzene sulfonate, sodium lauryl benzene sulfonate and sodium hexadecyl benzene sulfonate.

Other sulfonate surface active agents are contemplated also, e.g. the long chain alkyl sulfonates such as sodium hexadecane sulfonate and sodium octadecane sulfonate.

The well known sulfate detergents having 12 to 26 carbon atoms and particularly those having an alkyl radical of about 8 to 22 carbon atoms may be employed as anionic detergent bases in accordance with this invention. Such detergents include the sulfuric acid esters of polyhydric alcohols incompletely esterified with fatty acids, e.g. sodium coconut oil monoglyceride mono-sulfate, sodium tallow diglyceride mono-sulfate, the pure and mixed higher alkyl sulfates such as sodium lauryl sulfate and sodium cetyl sulfate. Further descriptive information regarding these compounds may be found in United States Patent 2,264,737.

Additional anionic surface active sulfonates and sulfates contemplated by this invention are the sulfated and sulfonated alkyl acid amides such as Igepon T

($C_{17}H_{33}CO.NHCH_2CH_2SO_3Na$)

the sulfated and sulfonated esters such as Igepon AP ($RCOOCH_2SO_3Na$ where R is an alkyl radical containing from 12 to 18 carbon atoms), sodium salt of the bisulfate of a dialkyl dicarboxylate, sodium salt of the sulfonic acid derivative of a dialkyl dicarboxylate, a sodium salt of sulfosuccinic acid such as

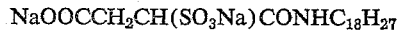
$NaOOCCH_2CH(SO_3Na)CONHC_{18}H_{27}$ and the like.

In addition to the organic anionic detergents, the non-ionic surface active agents containing the desired alkoxyalkyl dichlorocarbanilate derivatives provide effective bacteriostatic cleansing compositions. The non-ionic surface active agents contemplated are viscous liquid to wax-like water-soluble surface active substances containing a polyglycol ether group of the structure

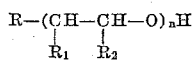
$$R-(CH-CH-O)_nH$$
$$\quad\; R_1\;\; R_2$$

wherein $R_1$ and $R_2$ are hydrogen or short chain alkyl, where $n$ is an integer greater than 3, and where R is a residue of a compound of a monomeric organic compound having an active hydrogen, e.g. alcohols, phenols, amides, primary amines, secondary amines, carboxylic acids, etc. These non-ionic detergents are well known (note U.S. 1,970,578 and U.S. 2,213,477) and may be typified by the polyalkylene oxide derivatives (i.e. polyethylene oxide, polypropylene oxide, polybutylene oxide) of water-insoluble higher fatty acids, such as lauric, oleic, palmitic and stearic acid and the like or mixtures thereof, such as the mixtures of fatty acids, obtained from animal and vegetable fats and oils or by oxidation of petroleum fractions such as paraffin wax. They may also be exemplified by the polyalkylene oxide derivatives of such water-insoluble organic hydroxy compounds as higher aliphatic alcohols (i.e. the alcohols corresponding to the fatty acids specified above or mixtures thereof), oil or phenols, particularly alkyl phenols containing at least six alkyl carbon atoms such as isooctyl-, di-tertiary butyl-, triisopropyl-, nonyl-, dodecyl-, octadecyl-phenols or naphthols, or higher alkyl alcohols, such as benzyl alcohol, cinnamyl alcohol. They may also be exemplified by the polyalkylene oxide derivatives of such amines as stearyl, lauryl, dicyclohexyl, dibutyl amine and the like. A particularly useful non-ionic detergent is that obtained by condensing one mol of tall oil with 5 to 15 mols of ethylene oxide (see U.S. 2,550,691).

The alkoxyalkyl 3,4-dichlorocarbanilates are also useful in preparing cleansing compounds formulated from a combination of surface active detergents plus other ingredients as illustrated by the following compositions:

| | Parts by weight |
|---|---|
| Triethanol amine lauryl sulfate | 60 |
| Methyl cellulose | 2 |
| Propylene glycol | 4 |
| Potassium stearate | 6 |
| Water | 130 |
| 11 - hydroxy - 3,6,9 - trioxaundecyl 3,4 - dichlorocarbanilate | 1 |

Moreover, the compounds of this invention may be incorporated in a detergent or mixtures of detergents to form useful antiseptic compositions as illustrated by the following:

| | Parts by weight |
|---|---|
| Tall oil-ethylene oxide condensation product (1 mol tall oil–11 mols ethylene oxide) | 20 |
| Sodium dodecyl benzene sulfonate | 80 |
| Carboxy methyl cellulose, sodium | 4 |
| Sodium tripolyphosphate | 80 |
| Sodium sulfate | 200 |
| 3,6,9,12,15,18,21 - heptoxadocosyl 3,4 - dichlorocarbanilate | 1 |

The alkoxyalkyl 3,4-dichlorocarbanilates of this invention may be employed in cosmetic compositions ordinarily used to beautify, cleanse or protect the skin in any amount sufficient to inhibit the growth of or to kill bacteria, specifically *Micrococcus pyogenes* var. *aureus*, normally present on the skin. Relatively small amounts of the alkoxyalkyl dichlorocarbanilates of this invention in cosmetics, particularly those having as a base an anionic or non-ionic organic detergent base composition or combination of said detergents, have been found to yield effective antiseptic compositions. With respect to cosmetics having an anionic or non-ionic detergent base amounts as low as 0.1% to 1% by weight based upon the total weight of the organic detergent may be employed. It is preferred in detergent cleansing compositions having an anionic detergent base or non-ionic detergent base to employ these alkoxyalkyl dichlorocarbanilates in amounts in the order of 1% to 3% by weight based on the total weight of detergent. While larger amounts with respect to the detergent base may be employed, the upper limit will be determined by practical considerations as well as by the particular cosmetic composition involved, i.e. whether the composition is to be used for cleansing purposes in the sense of a toilet soap or as a shaving cream or as a shampoo, etc. In cleansing compositions in the sense of a toilet soap containing an anionic organic detergent base (e.g. an alkali metal fatty acid detergent soap alone or in admixture with another anionic organic detergent such as the aforedescribed sodium alkyl aryl sulfonate detergents) or non-ionic detergent base, the amount of alkoxyalkyl dichlorocarbanilates of this invention ordinarily will not exceed 10% by weight of the detergent base. However, in shampoos, shaving creams and the like, employing an anionic detergent organic base or non-ionic detergent base the amounts of alkoxyalkyl dichlorocarbanilates of this invention may be present to the extent of 50% by weight based on the total detergent base content. Various colors, antioxidants, perfumes, water-softeners, salts such as silicates, chlorides, carbonates, phosphates and sulfates of alkali metals and the like builders, sodium carboxy methyl cellulose, the low molecular weight alcohols such as methanol, ethanol, isopropanol, ethylene glycol, and the like, may be included where desirable.

While this invention has been described with respect to certain embodiments, it is not so limited and it is to be understood that variations and modifications thereof obvious to those skilled in the art may be made without departing from the spirit or scope of this invention.

What is claimed is:

1. A compound of the formula

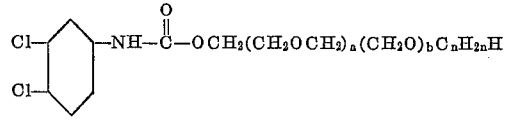

where $a$ is an integer from 2 to 8, $b$ is an integer from 0 to 1, and $n$ is an integer from 0 to 4.

2. 3,6,9,12,15,18,21 - heptoxadocosyl 3,4 - dichlorocarbanilate.

3. 2 - (2 - methoxyethoxy)ethyl 3,4 - dichlorocarbanilate.

4. 11 - hydroxy - 3,6,9 - trioxaundecyl 3,4 - dichlorocarbanilate.

References Cited in the file of this patent

UNITED STATES PATENTS

| 2,535,077 | Kunz et al. | Dec. 26, 1950 |
| 2,573,420 | Engel et al. | Oct. 30, 1951 |
| 2,634,289 | Butler | Apr. 7, 1953 |
| 2,678,302 | Beaver et al. | May 11, 1954 |
| 2,695,913 | Bloch et al. | Nov. 30, 1954 |
| 2,789,129 | Bissinger | Apr. 16, 1957 |
| 2,858,328 | Beaver et al. | Oct. 28, 1958 |
| 2,948,691 | Windemuth et al. | Aug. 9, 1960 |

OTHER REFERENCES

Beaver et al.: J. Am. Chem. Soc., 79, 1236–45 (1957).